(12) United States Patent
Reiss et al.

(10) Patent No.: US 6,895,293 B2
(45) Date of Patent: May 17, 2005

(54) FAULT DETECTION AND VIRTUAL SENSOR METHODS FOR TOOL FAULT MONITORING

(75) Inventors: Terry Reiss, San Jose, CA (US); Dimitris P. Lymberopoulos, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 520 days.

(21) Appl. No.: 09/833,516

(22) Filed: Apr. 11, 2001

(65) Prior Publication Data

US 2002/0055801 A1 May 9, 2002

Related U.S. Application Data

(60) Provisional application No. 60/232,598, filed on Sep. 14, 2000.

(51) Int. Cl.[7] .............................................. G06F 19/00
(52) U.S. Cl. ...................... 700/110; 700/108; 700/109; 700/121; 700/160; 700/174
(58) Field of Search ................................ 700/108, 109, 700/110, 111, 117, 121, 160, 174, 175, 177, 178

(56) References Cited

U.S. PATENT DOCUMENTS

| | | | |
|---|---|---|---|
| 5,592,402 A | 1/1997 | Beebe et al. | |
| 5,859,964 A | * 1/1999 | Wang et al. | .................. 714/48 |
| 5,877,032 A | 3/1999 | Guinn et al. | |
| 5,949,678 A | 9/1999 | Wold et al. | |
| 6,046,796 A | 4/2000 | Markle et al. | |
| 6,090,302 A | 7/2000 | Smith, Jr. | |
| 6,192,287 B1 | 2/2001 | Solomon et al. | |
| 6,442,445 B1 | * 8/2002 | Bunkofske et al. | ......... 700/108 |

FOREIGN PATENT DOCUMENTS

WO    WO 99/16108 A2    4/1999

* cited by examiner

*Primary Examiner*—Albert W. Paladini
*Assistant Examiner*—Charles Kasenge
(74) *Attorney, Agent, or Firm*—Townsend & Townsend & Crew

(57) ABSTRACT

Fault detection of a semiconductor processing tool employs several techniques to improve accuracy. One technique is sensor grouping, wherein a fault detection index is calculated from a group of tool operational parameters that correlate with one another. Another technique is sensor ranking, wherein sensors are accorded different weights in calculating the fault detection index. Improved accuracy in fault detection may be accomplished by employing a variety of sensor types to predict behavior of the semiconductor processing tool. Examples of such sensor types include active sensors, cluster sensors, passive/inclusive sensors, and synthetic sensors.

19 Claims, 10 Drawing Sheets

FAULT DETECTION AND VIRTUAL SENSOR METHODS FOR TOOL FAULT MONITORING

CROSS-REFERENCE TO RELATED APPLICATION

The present nonprovisional application claims priority from U.S. Provisional Patent Application No. 60/232,598 filed Sep. 14, 2000, which is hereby incorporated by reference.

BACKGROUND OF THE INVENTION

Semiconductor processing tools are highly complex devices. Their performance in real time is typically evaluated by monitoring values of a large number of tool sensors that reflect operational parameters such as temperature, pressure, and power. This tool evaluation may be conducted by comparing empirically measured sensor values to values predicted by a model.

An example of a model for predicting the behavior of a semiconductor processing tool is the Universal Process Modeling (UPM) technique. This model was developed by Triant Technologies, Inc., of Nanaimo, British Columbia.

FIG. 11 is a simplified schematic diagram illustrating the UPM technique. As shown in step A of FIG. 11, semiconductor processing tool 1101 is operated, and input vector 1102 comprising values 1104 for tool sensors 1106 is sampled at a time during the tool run (step A). Sampled input vector 1102 is then compared with reference data library 1112 (step B). Reference data library 1112 represents a compilation of vectors 1150–1157 from previous normal operation of semiconductor processing tool 1101. Vectors 1150–1157 of reference library 1112 include a value for each sensor of input vector 1102.

As a result of the comparison of step B, vector subset 1110 comprising vectors 1150, 1153, 1156, and 1157 is compiled from reference data library 1112 utilizing a nearest neighbor selection process between input vector 1102 and the vectors of reference data library 1112 (step C). Vectors 1150, 1153, 1156, and 1157 of vector subset 1110 reflect sensor values of previous normal operation of tool 1101 that most closely resemble input vector 1102. A variety of techniques may be employed in the nearest neighbor selection process as known to those of skill in the art. Precise details of the nearest neighbor section process utilized by the UPM model are proprietary.

Next, vectors 1150, 1153, 1156, and 1157 of subset 1110 are combined to produce a single output prediction vector 1116 (step D). Output prediction vector 1116 reflects the state of semiconductor processing tool 1101 in relation to previous normal operation. Output prediction vector 1116 may be communicated to the tool operator in several ways. For example, as shown in FIG. 11, values 1118 of individual sensors 1120 of output prediction vector 1116 may be combined to produce a single fault detection index 1114 that reflects the values of all of the tool sensors (step E). Alternatively, as shown in FIG. 12, values 1118 representing each individual sensor 1120 of the output prediction vector may be plotted along spokes 1202 of "bull's eye" graph 1200, with radial distance 1204 representing deviation of the measured sensor value from expected values.

One aspect of the UPM modeling technique just described is that it does not consider possible correlation between groups of related sensor values, such as related tool pressures, related tool temperatures, or related tool powers. Rather, all sensors are accorded equal weight in generating the fault detection index. This approach thus does not include potentially valuable correlation between related operational parameters that could provide more reliable fault detection information.

Moreover, while the bull's eye graph of FIG. 12 provides the tool operator with an organized presentation of real-time tool operational parameters, the operator must still continuously monitor each of the tool sensors in order to detect a fault. Doing this for a large number of sensors may occupy the operator's attention, diverting him or her from other important tool management tasks.

Another aspect of the modeling technique shown in FIG. 11 is that selection of nearest neighbor vectors to form the vector subset and the output prediction vector is based solely upon the sensor values. Other potentially relevant information, for example the time during the tool run at which the input vector is sampled, is not taken into account in the nearest neighbor selection process. This may affect the model's accuracy where the input vector and the library vector are similar merely by chance, for example where a temperature component of the input vector is measured at an early stage (ramp up) of a tool run, while the temperature component of the library vector is measured at a late stage (ramp down) of a tool run. In such a case values of the temperature component of the input and library vectors may be similar by chance, but the library vector is not otherwise an accurate prediction of the input vector.

Accordingly, more sophisticated techniques for fault detection of semiconductor processing tools are desirable.

SUMMARY OF THE INVENTION

Embodiments of the present invention relate to methods for fault detection of a semiconductor processing tool. In particular, embodiments of the present invention relate to methods and apparatuses that employ tool modeling techniques that enhance the accuracy of fault detection.

One embodiment of a fault detection method in accordance with the present invention comprises sensing a group of correlating operational parameters of a semiconductor processing tool operating under a recipe, and sensing non-correlating operational parameters of the tool operating under the recipe. An input vector is formed including the group of correlating operational parameters and the non-correlating operational parameters. The input vector is compared to a reference data library comprising vectors from previous tool runs utilizing the recipe. Nearest neighbor vectors to the input vector are selected from the reference data library based upon a similarity with only the group of correlating operational parameters. A vector subset is compiled from the selected nearest neighbor vectors. The vector subset is combined into an output prediction vector, and a fault detection index is generated from the output prediction vector.

This and other embodiments of the present invention, as well as its advantages and features, are described in more detail in conjunction with the text below and attached figures.

DESCRIPTION OF THE SPECIFIC EMBODIMENTS

Figure 1A:
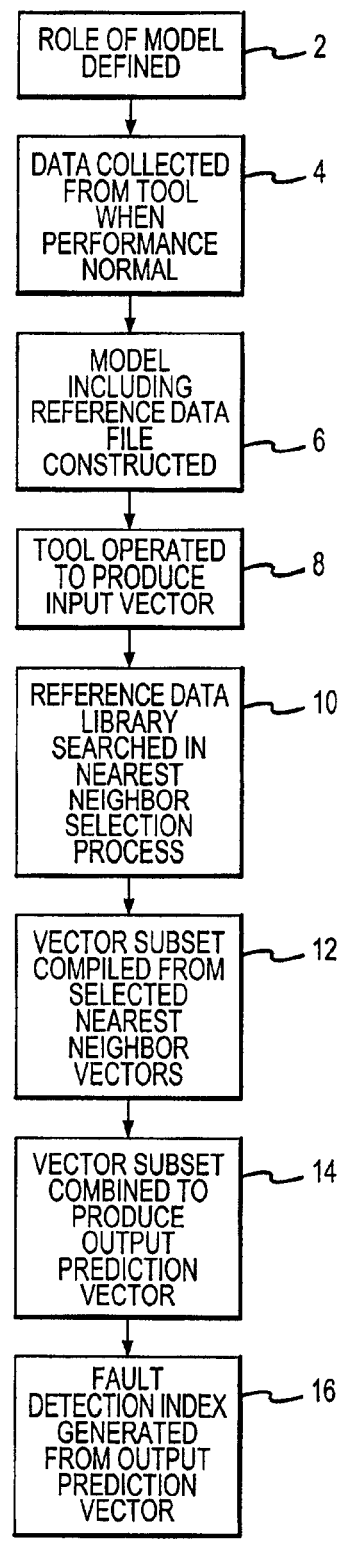
FIG. 1A is a simplified flow chart summarizing one embodiment of the method according to the present invention.
Figure 1B:
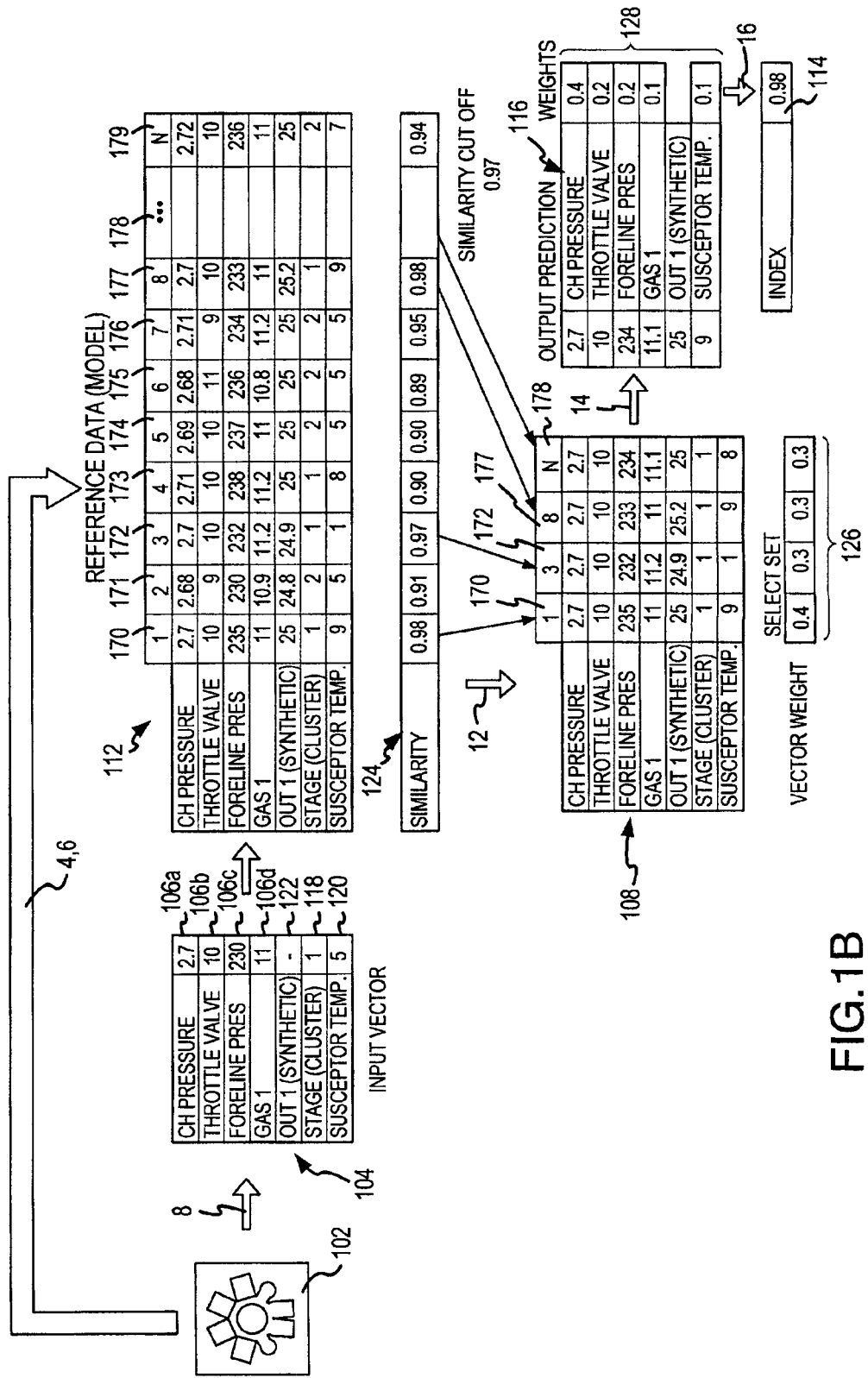
FIG. 1B is a schematic diagram illustrating operational details of the method shown in FIG. 1A.

As mentioned above, embodiments of the invention relate to methods and apparatuses that employ tool modeling techniques that enhance the accuracy of fault detection in semiconductor processing tools. In order to better appreciate and understand the present invention, reference is made to FIGS. 1A and 1B and the accompanying text below. FIG. 1A is a simplified flow chart showing the steps according to one embodiment of the method according to the present invention, while FIG. 1B is a schematic diagram illustrating operational details of one example of the method shown in FIG. 1A used in conjunction with detecting faults during the operation of a plasma etching tool 102. Reference to plasma etching tool 102 is made for exemplary purposes only. It is to be undestood that the present invention is applicable to detecting faults in other semiconductor fabrication tools including CMP tools, deposition tools and ion implant tools among others.

Before utilizing the present invention to detect tool faults, a fault detection model must be developed. Developing the fault detection model includes associating various characteristics of tool 102 with sensors that are included in vectors of the model (FIG. 1A, step 2). As used herein, the term "sensor" refers to an operational parameter of the semiconductor fabrication tool. Sensors can be of different types, as is described in more detail below. As used herein, the term "sensor types" refers to the role played by a particular sensor value in modeling and fault detection processes. A particular sensor type may or may not represent a tool operational parameter that is measured in real time.

In the example shown in FIG. 1B, there are seven different sensors: chamber pressure sensor 106a, throttle valve pressure sensor 106b, foreline pressure sensor 106c, gas 1 pressure sensor 106d, out 1 sensor 122, cluster sensor 118 and susceptor temperature sensor 120. It is to be understood that the seven sensors illustrated in the example are for exemplary purposes only. A typical fault detection model according to the invention as employed in a production environment will include considerably more than seven sensors.

After the various sensor are defined and assigned sensor types, data is collected during acceptable runs of the tool under a specific recipe and associated with the defined sensors (FIG. 1A, step 4). Next, a model representing operation of the tool is constructed from the collected data (FIG. 1A, step 6). The model includes a reference data library, as well as rules for producing an output vector and fault detection index from data of an input vector that is compared to the reference library.

An example of a reference data library is shown in FIG. 1B as library 112. Reference data library 112 includes a plurality of reference data vectors 170–179 compiled from the collected data. Each vector includes as components the sensors defined by the model, as well as the collected data that is associated with each sensor. Thus, each vector in library 112 of FIG. 1B includes seven sensors. The data in library 112 represents parameters of tool 102 during proper operation under a specific plasma etching recipe. Rules for producing the output vector and fault detection index from the model further include, among others, rules assigning weights to certain sensors and rules to decide comparison thresholds.

Once library 112 is compiled and the fault detection model is completed, the model is ready to monitor tool 102 for faults in a production environment where tool 102 is operated under the specific recipe used to produce reference data library 112. During such use, an input vector 104 is sampled from the tool (FIG. 1A, step 8). Vector 104 includes the same sensors as the vectors in library 112. Once generated, vector 104 is input to the fault detection model in order to generate a fault detection index.

As shown in FIG. 1A, the fault detection index is created using a multistep process where first input vector 104 is compared to library 112 using a nearest neighbor approach to detect similar reference vectors (FIG. 1A, step 10). Next, the library vectors most similar to input vector 104 are compiled into a vector subset 108 (FIG. 1A, step 12). An output prediction vector 116 is then generated from the vector subset (FIG. 1A, step 14) and finally, a fault detection index 114 is generated from prediction vector 116 (FIG. 1A, step 16). Specific details concerning generation of fault detection index 114 during steps 10–16 according to one embodiment of the invention are discussed below with respect to FIG. 1B. The generation of the fault detection index is based, in part, on applying different rules to different types of sensors. Thus, in order to better understand this example, a description of the different sensor types is in order.

As previously mentioned, there are four different sensor types: active sensors, cluster sensors, passive/inclusive sensors and synthetic sensors. Active sensors are sensors that represent a group of correlating operational parameters. Embodiments of the invention group correlating active sensors together as one technique to improve fault detection. Sensor grouping enables a specialized fault detection index 116 to be calculated based upon tool operational parameters known to correlate with one another. Examples of correlating sets of tool operational parameters may include sets of tool temperatures or sets of tool pressures. Sensor grouping eliminates coincidences in tool data that could represent a fault, when in fact no tool fault has occurred.

In the example of FIG. 1B, it is known from operator experience that one group of correlating parameters of plasma etching tool 102 relates to pressure. Accordingly, chamber pressure sensor 106a, throttle valve pressure sensor 106b, foreline pressure sensor 106c and gas 1 pressure sensor 106d are all classified as active sensors. As explained in detail below, active type sensors are utilized in the selection process of the nearest neighbor vectors to compile a related vector subset, and they are also included in generating the fault detection index from the output prediction vector.

Figure 9A:
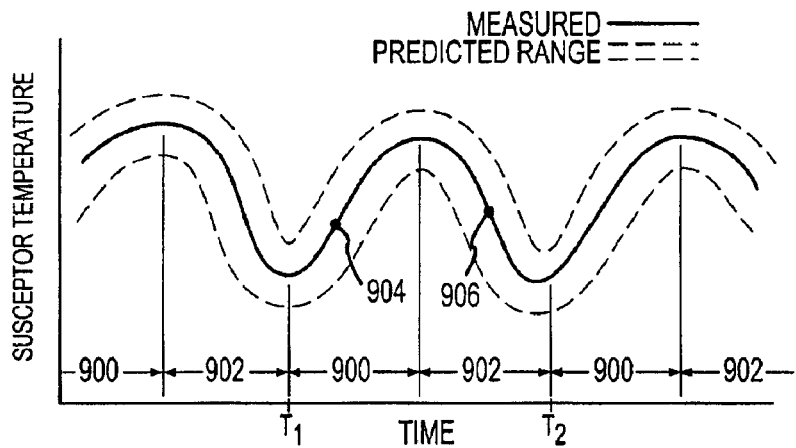
FIG. 9A plots actual and predicted susceptor temperature over time for a properly functioning etch tool.

Another technique used by embodiments of the invention includes refining the nearest neighbor selection process by including criteria other than similarity in the value of vector components. For example, FIG. 9A plots predicted and measured values for susceptor temperature of a plasma etching tool that is functioning normally. Susceptor temperature is cyclical over time, with an increase in susceptor temperature during first stage 900 of the etch process followed by a decline in susceptor temperature during second stage 902 of the etch process.

Embodiments of the invention reference the stage of the plasma etching process when the input vector is measured in the selection of nearest neighbor vectors. For example, as shown in FIG. 9A susceptor temperature 904 of an input vector measured during first stage 900 of the etch process may be the same as susceptor temperature 906 of a library vector measured during second stage 902 of the etch process. In such a case, while susceptor temperatures 904 and 906 may happen to be the same, the library vector is otherwise not an accurate prediction of the input vector. Accordingly, embodiments of the invention employ a cluster type sensor, such as sensor 118, to represent the stage in the plasma etching process of tool 102 at which input vector 104 is sampled. As described in detail below, cluster type sensor values are included in the nearest neighbor selection process, but are not included in calculating the fault detection index.

A third type of sensor, the passive/inclusive sensor type, is a sensor that represents a tool operational parameter that does not correlate strongly with the active type sensors, but which is expected from operator experience to provide important tool fault information. An example of a passive/inclusive sensor type is susceptor temperature sensor 120 in FIG. 1B. The susceptor temperature of plasma etching tool 102 does not correlate strongly with the active (pressure) sensors 106a–d, but it is known from user experience that susceptor temperature is a key fault indicia for the particular etch process being monitored. Thus, embodiments of the invention include passive/inclusive sensor 120 in calculation of a fault detection index, even where the active type sensors used to predict the output vector comprise a set of correlating tool pressures. Passive/inclusive type sensors are not utilized in the nearest neighbor selection process, but are utilized in generating the fault detection index.

Finally, a fourth class of sensor is the synthetic sensor type, which may be employed to expand the predictive capability of the model. Specifically, synthetic type sensors represent physical quantities that cannot be measured during real time operation of the tool, but which can be measured and assigned to a particular vector upon completion of the semiconductor process. In the specific example of FIG. 1B, a synthetic sensor type 122 represents a critical dimension (CD) of a semiconductor feature resulting from plasma etching. The CD cannot be measured during etching, but can be measured after etching and then be included as a component of a library vector. Subsequent selection of nearest neighbor vectors would result in prediction of a critical dimension.

Synthetic sensor types are merely predicted by the model, and are not utilized in the selection process of the nearest neighbor vectors or in generating the fault detection index. Input of the synthetic type sensor 122 is not required by the model and input vector 104 includes a null value for synthetic type sensor 122. However, as discussed below, the output vector produced by the model includes a predicted value for the synthetic type sensor 122.

For reference, a general summary of the role of each sensor type is listed below in TABLE 1.

TABLE 1

| SENSOR TYPE | EXAMPLE | INPUT REQUIRED? | VALUE PREDICTED BY MODEL? | CORRELATION WITH OTHER ACTIVE SENSORS? | USED TO SELECT VECTOR SUBSET? | USED TO CALCULATE FAULT DETECTION INDEX? |
|---|---|---|---|---|---|---|
| Active | chamber pressure | Yes | Yes | Yes | Yes | Yes |
| Passive/ Inclusive | susceptor temperature | Yes | Yes | No | No | Yes |
| Synthetic | out 1 | No | Yes | Not Applic. | No | No |
| Cluster | stage | Yes | No | Not Applic. | Yes | No |

Returning to FIG. 1A, once the input vector has been sampled from the semiconductor fabrication tool, the next step is to compare the input vector to the reference library compiled during prior normal operation of the tool. Referring back to the nearest neighbor algorithm of step 10, the example shown in FIG. 1B employs two steps to gauge similarity between input vector 104 and vectors 170–179 of reference data library 112. In a first test, input vector 104 is compared with reference data library 112 and similarity factor 124 is generated for each of vectors 170–179. Similarity factor 124 reflects similarity to active type sensors 106a–d of input vector 104. One approach to generating similarity factor 124 may be through the operation of the proprietary UPM software program previously described. Vectors having a similarity factor 124 exceeding a cut-off value (0.97 in the example of FIG. 1B) pass the first test. The values of passive/inclusive type sensor 120 and synthetic type sensor 122 are not included in calculating similarity factor 124. As shown in FIG. 1B, vectors 170, 172, 173, 177, and 178 pass the first test.

In the second test, cluster type sensor 118 of input vector 104 is compared with cluster type sensors of the vectors of reference data library 112. In the example shown in FIG. 1B, this comparison test requires identity between the cluster sensors (i.e., only reference data library vectors at stage 1 pass the second test). Alternatively, this comparison test may require less than an exact match between the cluster sensor types (i.e., where the cluster sensor is quantified in units of seconds rather than "stages", library vectors measured within a specific range of seconds of the input vector may pass the second test). As shown in FIG. 1B, library vectors 170, 172, 177, and 178 also pass the second test. Vector 173 fails the second test because of non-identity between its cluster type sensor component and that of input vector 104.

Next in step 12, vector subset 108 is compiled from library vectors 170, 172, 177, and 178 satisfying both the first and the second tests. The vectors of subset 108 include predicted values for the active, cluster, passive/inclusive, and synthetic sensor types.

In step 14, vectors 170, 172, 177, and 178 of vector subset 108 are combined to produce an output prediction vector 116. In the specific example shown in FIG. 1B, output prediction vector 116 is generated by assigning a first set of weights 126 to vectors 170, 172, 177, and 178, and then combining the weighted vectors. Alternatively, this vector combination step could utilize no weighting at all and assign equal weight to each vector of the subset. As yet another alternative, the combination could utilize a weighing system that considers similarity factor 124 previously generated for each vector.

In step 16, fault detection index 114 is generated from output prediction vector 116. Sensor ranking is an additional technique that may be employed to improve the accuracy of fault detection. Active and passive/inclusive type sensors of vector 116 may be ranked in terms of their relative importance in indicating a tool fault utilizing second set of weights 128. The weighted sensor values can then be combined to produce fault detection index 114. The values of synthetic type sensor 122 and cluster type sensor 118 are not included in this calculation.

Experimental results of fault detection in accordance with the present invention are now described below in connection with FIGS. 3A–9C.

Experimental Results

I. Sensor Grouping

Plasma etching of oxide layers is frequently performed during the formation of vias in integrated circuits. As a result of oxide etching, polymer materials may accumulate that interfere with correct positioning of the wafer. This can affect product yields. Ordinarily the polymer residues are removed by periodic cleaning steps.

To evaluate a fault detection method in accordance with the present invention, a series of over 1400 consecutive oxide plasma etching runs utilizing an Applied Materials Centura° plasma etching device were performed, without any intervening cleaning steps. Tool sensor information was collected and modeled utilizing Modelware/RT software manufactured by Triant Technologies, Inc. of Nanaimo, British Columbia.

Figure 2A:
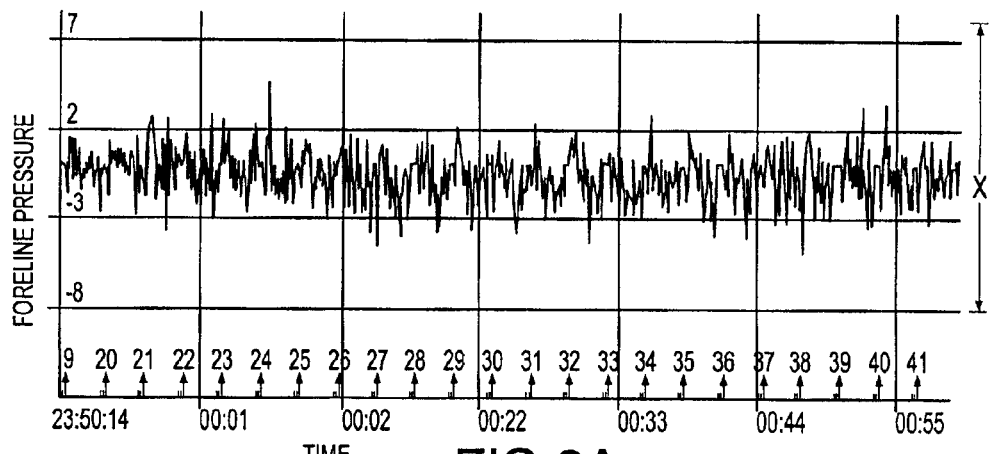
FIG. 2A plots values for foreline pressure for an initial series of test runs of a plasma etching tool.
Figure 2B:
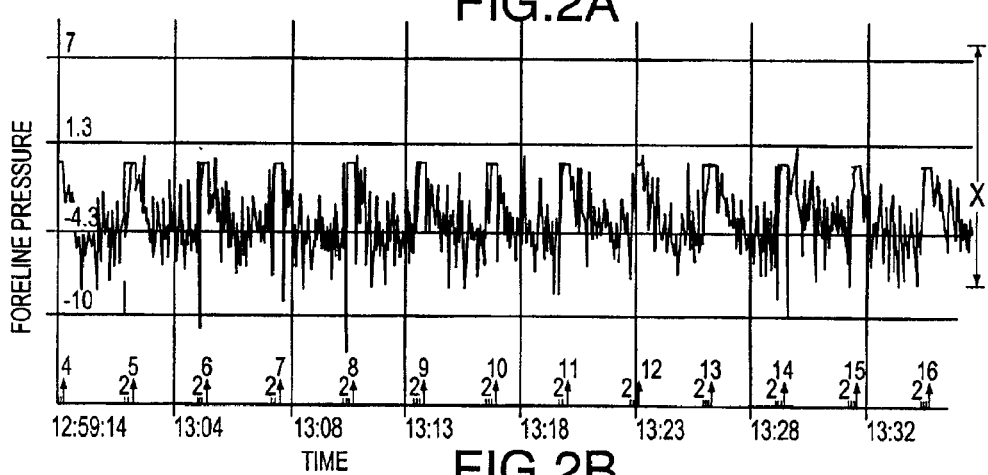
FIG. 2B plots values for foreline pressure for an intermediate series of test runs.
Figure 2C:
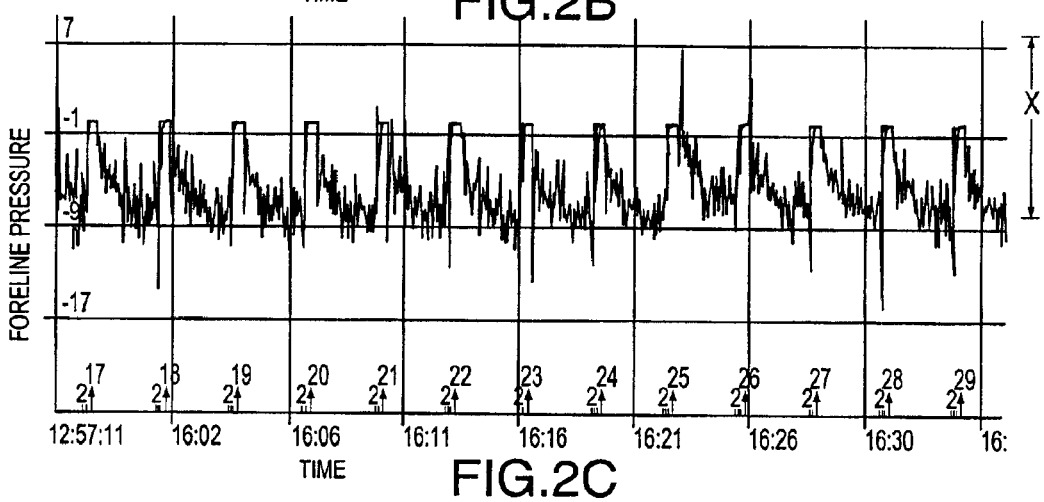
FIG. 2C plots values for foreline pressure for a later series of test runs.

Residual values represent the difference between an actual measured value from the tool and a value predicted by the model. FIGS. 2A–2C plot the residual value of foreline pressure, at the beginning, middle, and end of the series of processing runs. FIG. 2A plots values for residual foreline pressure for a beginning portion the 1400 consecutive test runs. FIG. 2A shows that values for residual foreline pressure at first remained comfortably within expected tolerance region X.

FIG. 2B plots values for residual foreline pressure for an intermediate portion of the test runs. FIG. 2B shows a drift in the residual value of foreline pressure to the lowermost portion of tolerance region X.

FIG. 2C plots values for foreline pressure for a later portion of the test runs. FIG. 2C shows that the drift in the residual value of foreline pressure indicated in FIG. 2B has continued, such that the foreline pressure is now out of the tolerance region X. With conventional fault detection methods, this trend would likely alarm the tool and halt wafer production. However, correlation of the foreline pressure data with other tool information, and hence the actual existence of a fault, would remain undetermined.

Therefore, the state of the plasma etching tool over the same series of 1400 consecutive processing runs was examined utilizing four specialized fault detection indices, each including different active sensor groupings. The active sensors for each fault detection index are listed below in TABLE 2.

TABLE 2

| ACTIVE SENSOR NO. | FIRST FAULT DETECTION INDEX | SECOND FAULT DETECTION INDEX | THIRD FAULT DETECTION INDEX | FOURTH FAULT DETECTION INDEX |
| --- | --- | --- | --- | --- |
| 1 | chamber pressure | chamber wall temperature | DC bias | chuck current |
| 2 | throttle valve position | chuck temperature | forward power | chuck voltage |
| 3 | foreline pressure | heat exchanger temperature | reflected power | inner helium flow |
| 4 | gas 1 inlet pressure | cathode temperature | load blade position | outer helium flow |

TABLE 2-continued

| ACTIVE SENSOR NO. | FIRST FAULT DETECTION INDEX | SECOND FAULT DETECTION INDEX | THIRD FAULT DETECTION INDEX | FOURTH FAULT DETECTION INDEX |
|---|---|---|---|---|
| 5 | gas 2 inlet pressure | none | tune blade position | inner helium pressure |
| 6 | none | none | none | outer helium pressure |

TABLE 2 illustrates the reduction in data offered by sensor grouping. Specifically, information of a total of 20 sensors is condensed into just four fault detection indices.

Figure 3:
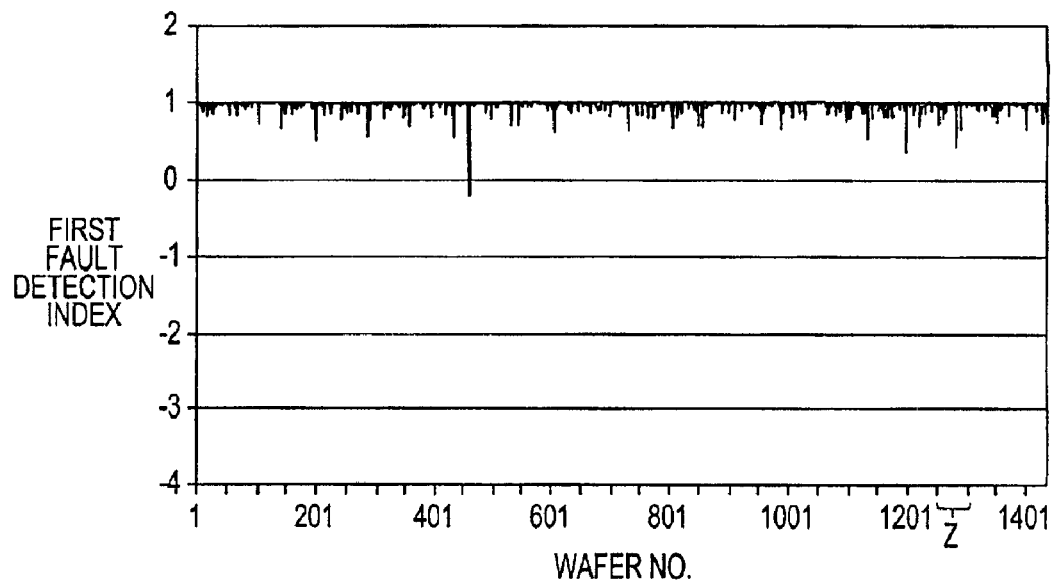
FIG. 3 plots the second fault detection index of TABLE 2 over a series of test runs.

The enhanced precision of fault detection offered by the indices of TABLE 2 is discussed below in conjunction with FIGS. 3–7D. FIG. 3 plots the second fault detection index over the entire processing run of >1400 wafers. This second fault detection index, which focuses upon temperature, does not reveal a fault in the plasma etching tool.

Figure 4:
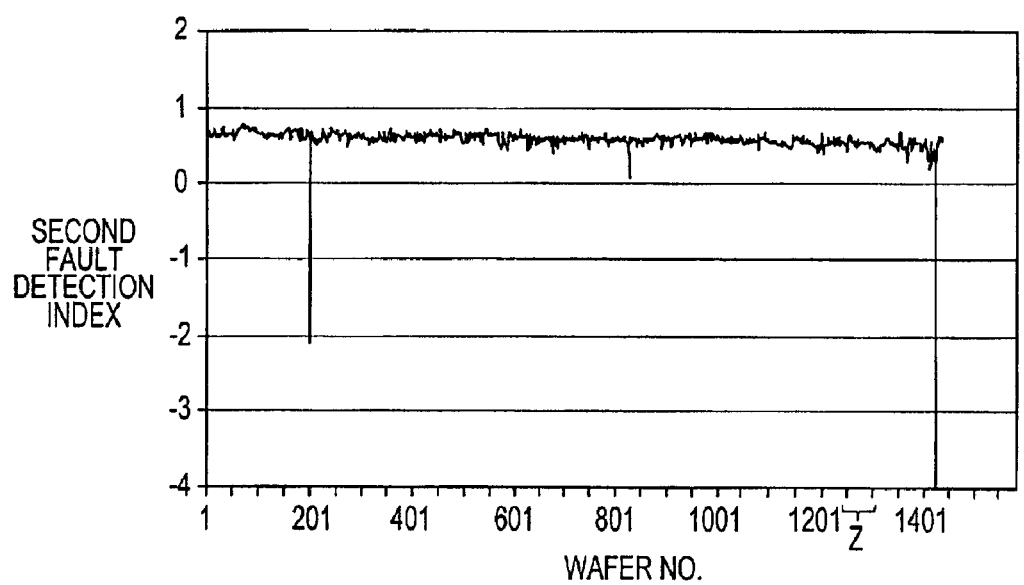
FIG. 4 plots the third fault detection index of TABLE 2 over the same series of test runs of FIG. 3.

FIG. 4 plots the third fault detection index over the processing run. Apart from a single fault at around wafer 200, this third index focusing upon power also does not reveal a tool fault. The spike at around wafer 200 was associated with etching of a bare silicon wafer lacking an oxide layer that was inadvertently placed into the etching tool.

Figure 5:
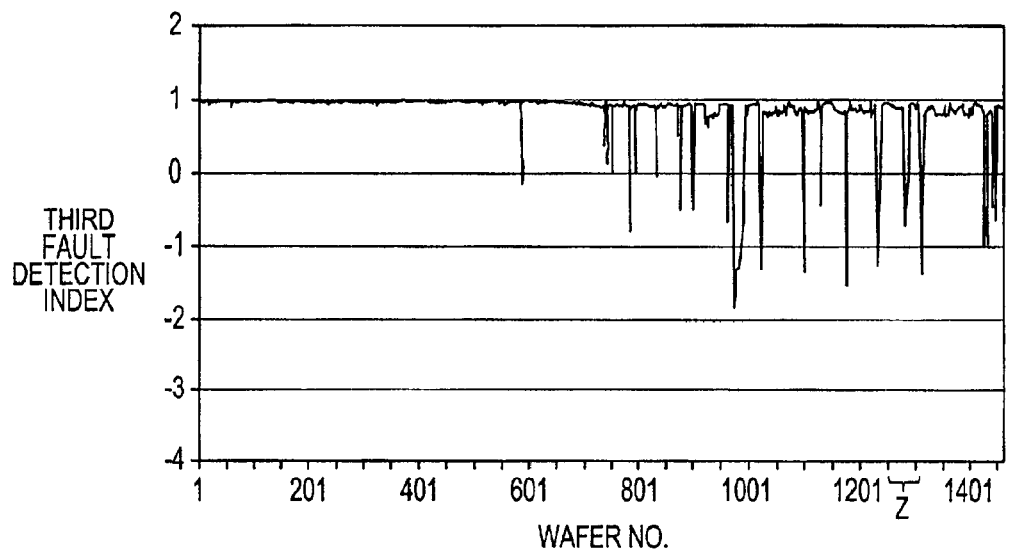
FIG. 5 plots the fourth fault detection index of TABLE 2 over the same series of test runs of FIG. 3.

FIG. 5 plots the fourth fault detection index over the processing run. This third fault detection index, which focuses upon wafer chucking, reveals an initial fault at around wafer 600, followed with increasingly frequent faults. The fourth fault detection index indicates a likely problem with chucking of the wafer about halfway through the 1400+ test runs. This was likely due to the buildup of residues due to an absence of periodic cleaning steps.

Figure 6:
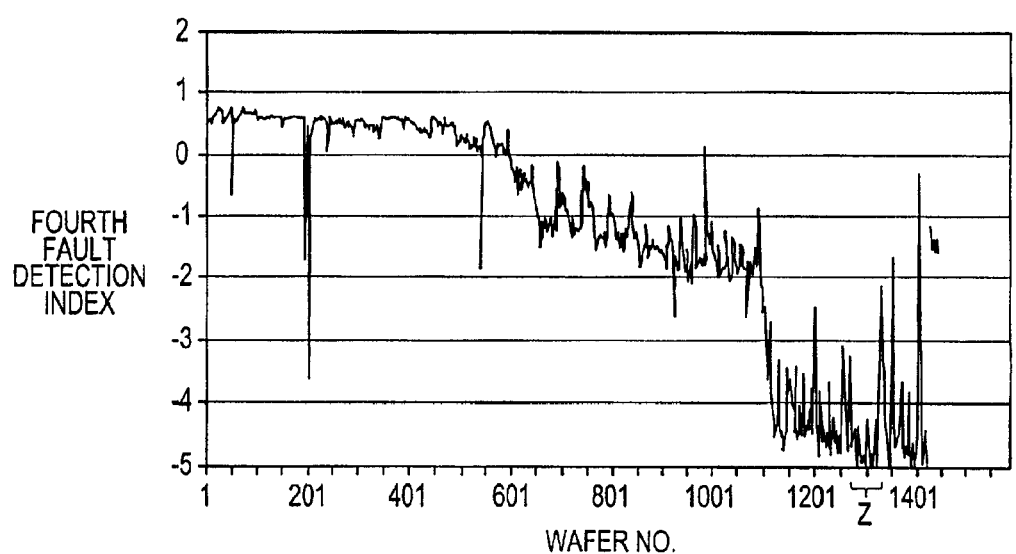
FIG. 6 plots the first fault detection index of TABLE 2 over the same series of test runs of FIG. 3.

FIG. 6 plots the first fault detection index over the processing run. This fault detection index, which focuses upon pressure, reveals a fault at about wafer 200, corresponding to processing of the bare silicon wafer. Moreover, FIG. 6 also reveals an increase in the incidence of tool fault after about wafer number 600. This trend in the first fault detection index further indicates a tool fault.

In order to more specifically examine the causes of the tool fault indicated by FIGS. 5 and 6, FIGS. 7A–7D plot values for several of the active sensors of the first fault detection index during portion "Z" occurring late in the series of processing runs shown in FIGS. 3–6.

Figure 7A:
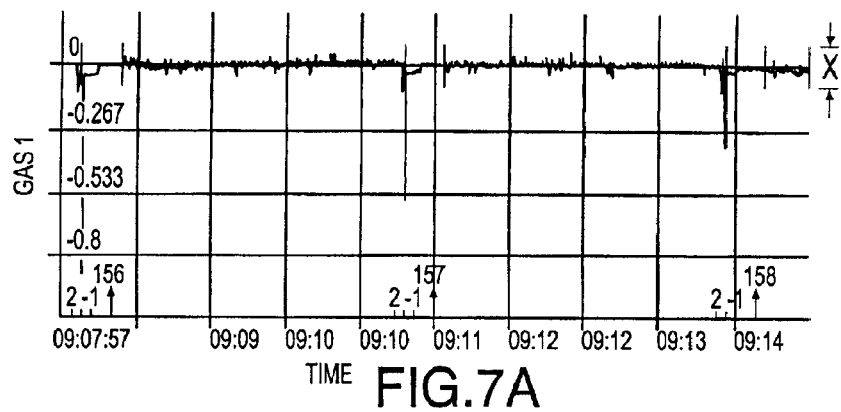
FIG. 7A plots gas 1 inlet pressure for portion Z of the test runs of FIGS. 3–6

FIG. 7A plots the gas 1 inlet flow. FIG. 7A indicates that the gas 1 flow inlet pressure remained within tolerance band X. The fault indicated by the fourth fault detection index was thus not attributable to gas 1 inlet flow pressure.

Figure 7B:
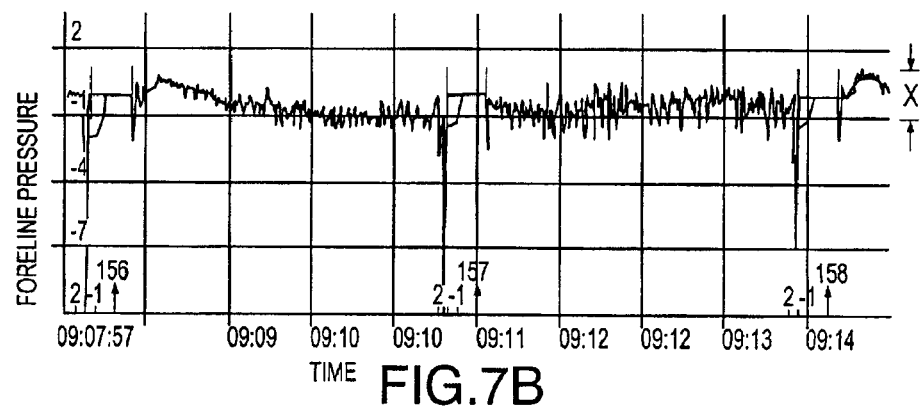
FIG. 7B plots foreline pressure for portion Z of the test runs of FIGS. 3–6.

FIG. 7B plots foreline pressure sensor for same portion Z of FIG. 7A. FIG. 7B indicates that foreline pressure was out of tolerance band X.

Figure 7C:
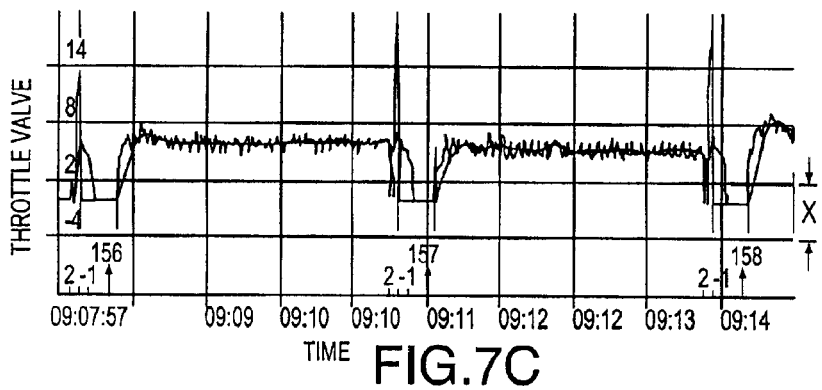
FIG. 7C plots throttle valve for portion Z of the test runs of FIGS. 3–6.
Figure 7D:
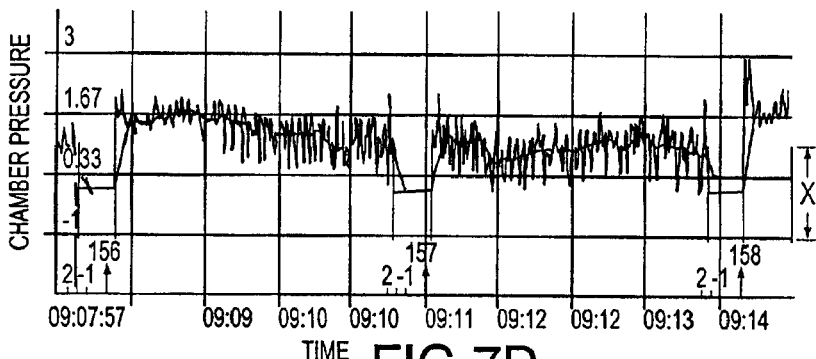
FIG. 7D plots chamber pressure for portion Z of the test runs of FIGS. 3–6.

FIG. 7C plots the throttle valve sensor for the same portion Z of FIG. 7A. FIG. 7D plots the chamber pressure sensor for portion Z. FIGS. 7C and 7D reveal that the throttle valve and chamber pressure lie substantially out of acceptable tolerance band X.

The value of the sensor readings of FIGS. 7A–7D, and their correlation to one another, confirm the existence of a tool fault as initially indicated by the decline in foreline pressure shown in FIGS. 2A–2C. When combined, the throttle value, foreline pressure, and chamber pressure active sensor values account for the decline in the fourth fault detection index, and provide a more accurate picture of the status of the plasma etching tool than any single sensor considered independently.

B. Cluster Sensor

While the above experimental results illustrate the impact of sensor grouping in revealing the existence of a tool fault, utilization of the cluster sensor also enhances the accuracy of fault detection.

Figure 8A:
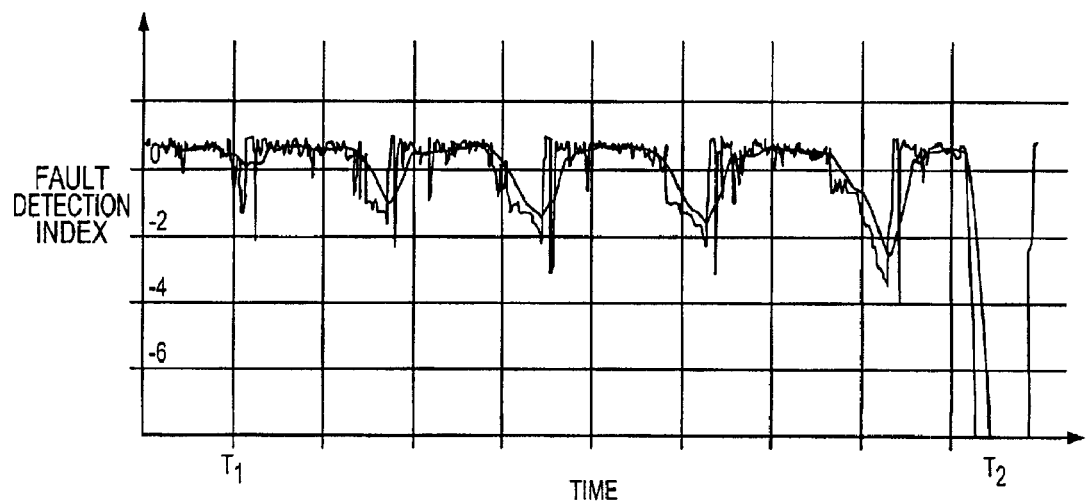
FIG. 8A plots fault detection index versus time for a fault detection method which does not utilize cluster sensor information in the selection process of the nearest neighbor vectors.

FIG. 8A plots a fault detection index versus time for a process run of a plasma etching tool experiencing a tool fault. The method of FIG. 8A considers the value of the cluster sensor in the selection process of the nearest neighbor vectors to compile the vector subset. FIG. 8A represents a highly accurate picture of the status of the tool, with the fault detection index progressively worsening from time $T_1$ until the tool is ultimately halted and alarmed at time $T_2$.

Figure 8B:
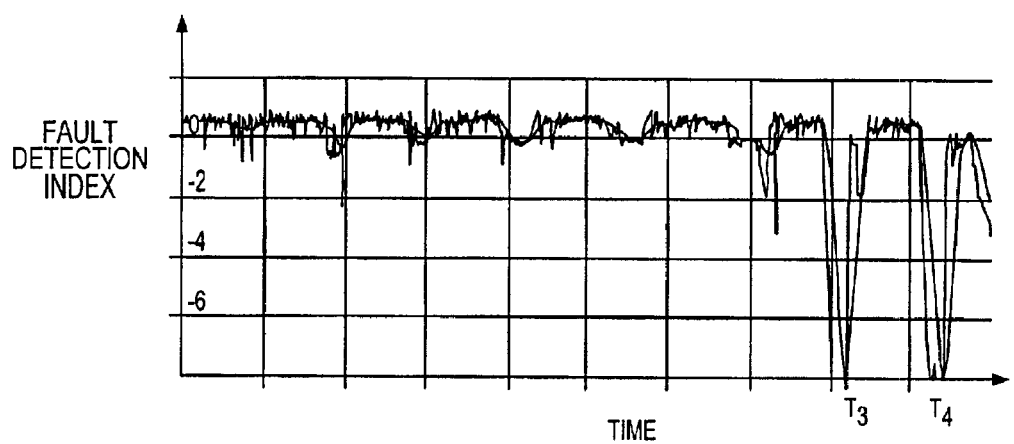
FIG. 8B plots fault detection index versus time for a fault detection method which utilizes cluster sensor information in the selection process of the nearest neighbor vectors.

By contrast, FIG. 8B plots the same process run where the value of the cluster sensor is not included in the selection process of the nearest neighbor vectors to compile the vector subset. FIG. 8B represents a less accurate picture of the status of the tool, with an abrupt drop in the fault detection index occurring at time $T_3$ immediately prior to alarming and halting of the tool at time $T_4$. The advance warning of a fault provided by the method of FIG. 8A would afford the tool operator significant lead time to recognize and correct a fault. Early fault recognition would thus reduce the number of wafers ultimately falling outside of acceptable tolerances, raising tool yields.

C. Passive/Inclusive Sensor

Utilization of the passive/inclusive sensor type also provides benefits in fault detection. For example, an operational parameter such as susceptor temperature may provide important fault detection information. However, susceptor temperature does not correlate strongly with the related active pressure sensors of the first fault detection index of TABLE 2.

If the susceptor temperature is defined as an active sensor, it is included in the nearest neighbor selection process. However, this is undesirable where the tool performance is to be modeled based upon other strongly correlating sensors. The role of the passive/inclusive sensor type is best understood in conjunction with FIGS. 9A–9C below.

FIG. 9A plots measured susceptor temperature and the predicted susceptor temperature range over time, for a properly functioning etch tool. Both measured and predicted susceptor temperature are cyclical between times $T_1$ and $T_2$.

Figure 9B:
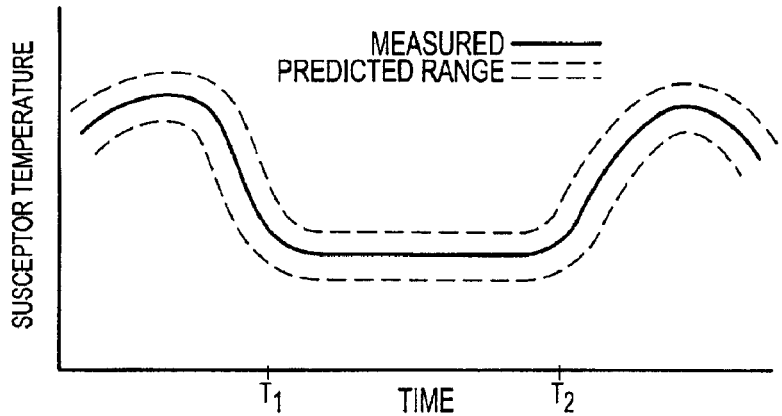
FIG. 9B plots actual and predicted susceptor temperature over time for a method in which susceptor temperature is an active sensor type.

FIG. 9B plots measured susceptor temperature and the predicted susceptor temperature range over time, in a predictive model in which the susceptor temperature is an active sensor type. FIG. 9B indicates that at time $T_1$ the tool experiences a fault and the measured susceptor temperature departs from its expected cyclical behavior, remaining constamt through $T_2$. Susceptor temperature does not correlate strongly with the group of related active pressure sensors. However, because susceptor temperature is an active sensor type and is considered in selection of the nearest neighbor vectors, the vector subset predicted by the model reflects the flat shape that conforms to the change in actual temperature. This change in predicted temperature masks the tool fault indicated by the constant flat profile of measured temperature between times $T_1$ and $T_2$.

Figure 9C:
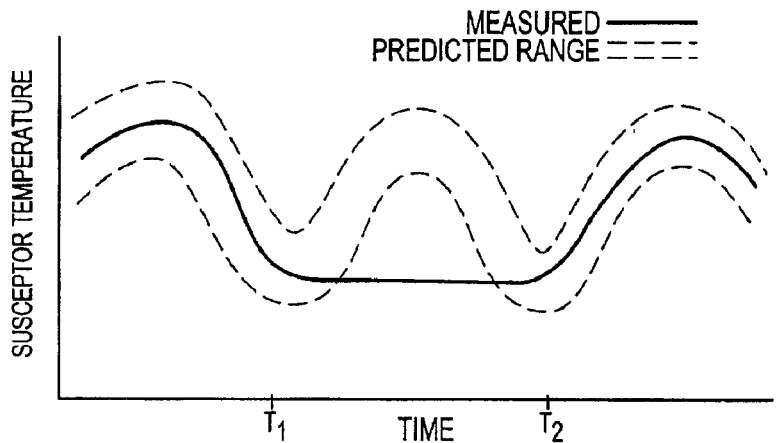
FIG. 9C plots actual and predicted susceptor temperature over time for a method in which susceptor temperature is a passive/inclusive sensor type.

By contrast, FIG. 9C plots the measured susceptor temperature and a predicted susceptor temperature range over time, in a predictive model in which susceptor temperature is a passive/inclusive sensor type. Like the tool of FIG. 9B, the tool of FIG. 9C experiences a fault at time $T_1$. However, because the measured susceptor temperature is not included in selecting the nearest neighbor vectors of the subset, the predicted susceptor temperature range does not remain flat at time $T_1$ to match the measured value. Rather, in FIG. 9C the flat profile in actual susceptor temperature beginning at time $T_1$ passes outside of the predicted range and is thus recognizable as a tool fault.

Apparatus for Fault Detection

Figure 10:
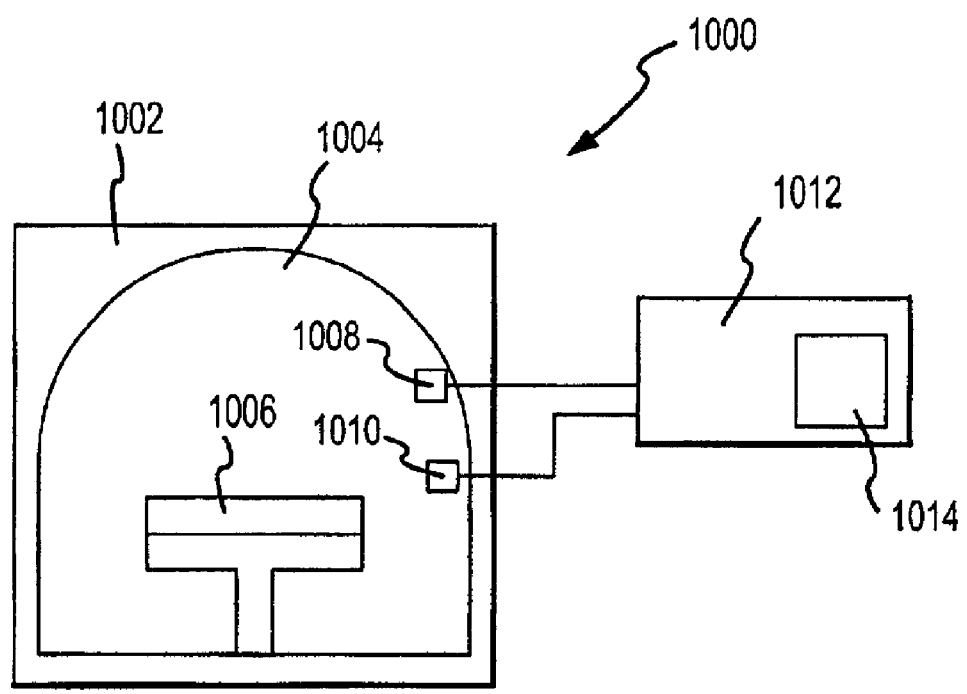
FIG. 10 shows a simplified view of an apparatus configured to practice an embodiment of a method in accordance with the present invention.
Figures 11, 12:
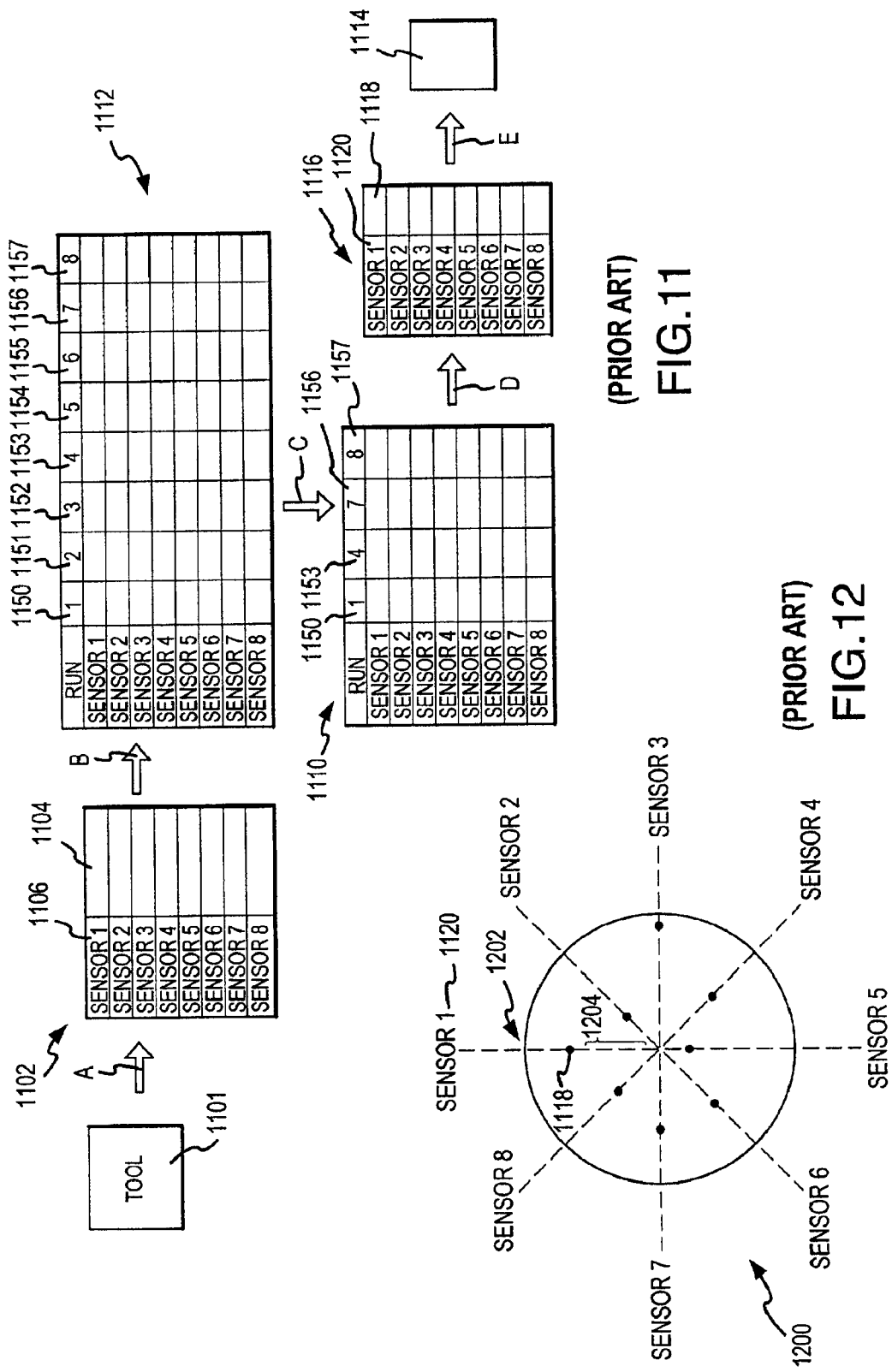
FIG. 11 is a simplified schematic diagram illustrating the steps of the UPM technique.
FIG. 12 is a "bull's eye" graph of a conventional fault detection method.

FIG. 10 shows a simplified view of an apparatus configured to practice an embodiment of a method in accordance with the present invention. Apparatus 1000 includes semiconductor fabrication tool 1002 including wafer processing chamber 1004 having wafer 1006 positioned therein. Apparatus 1000 also includes first sensor 1008 and second sensor 1010 operatively coupled to tool 1002 to detect operational parameters of tool 1002.

Controller 1012 is in communication with tool 1002, and with first and second sensors 1008 and 1010. Memory 1014 is coupled to controller 1012, and memory 1014 stores a computer program in computer readable format including computer instructions to control said apparatus to sense a group of correlating operational parameters from the semiconductor processing tool operating under a recipe. The computer instructions also control said apparatus to compare the group of correlating operational parameters to corresponding operational parameters recorded during prior runs of the tool utilizing the recipe, and to generate a fault detection index from comparing the sensed group of operational parameters to the corresponding operational parameters recorded during prior runs.

While the present invention has been described in FIG. 1B in conjunction with detecting a fault in a plasma etching tool, the semiconductor fabrication tool of FIG. 10 is not limited to this specific embodiment. In accordance with one alternative embodiment of the present invention, a fault in a chemical-mechanical polishing (CMP) apparatus could be detected. In accordance with other alternative embodiments of the present invention, faults in other semiconductor fabrication tools such as chemical vapor deposition tools and lithography apparatuses could be detected.

In addition, the above invention has been described in conjunction with a fault detection method utilizing selection of nearest neighbor vectors from a reference data library, this is not required by the present invention. The technique of grouping together sensors that correlate with one another to create fault detection indices could be utilized in other modeling approaches, and the method would still remain within the scope of the present invention.

Given the above detailed description of the present invention and the variety of embodiments described therein, these equivalents and alternatives along with the understood obvious changes and modifications are intended to be included within the scope of the present invention.

What is claimed is:

1. A fault detection method comprising:

sensing a group of correlating operational parameters of a semiconductor processing tool operating under a recipe;

sensing at least one non-correlating operational parameter of the tool operating under the recipe;

forming an input vector including the group of correlating operational parameters and the at least one non-correlating operational parameter;

comparing the input vector to a reference data library comprising vectors from previous tool runs utilizing the recipe;

selecting from the reference data library one or more nearest neighbor vectors to the input vector based upon a similarity with the group of correlating operational parameters; and generating a fault detection index from the selected nearest neighbor vectors.

2. The method of claim 1 wherein sensing the group of correlating operational parameters comprises sensing operational parameters relating to tool pressure.

3. The method of claim 1 wherein sensing the group of correlating operational parameters comprises sensing operational parameters relating to tool temperature.

4. The method of claim 1 wherein sensing the group of correlating operational parameters comprises sensing operational parameters relating to tool power.

5. The method of claim 1 wherein sensing the group of correlating operational parameters comprises sensing operational parameters relating to positioning of a wafer within the tool.

6. The method of claim 1 wherein the fault detection index is generated by compiling a vector subset from the selected nearest neighbor vectors, combining the vector subset into an output prediction vector, and generating a fault detection index from the output prediction vector.

7. The method of claim 6 wherein the output vector comprises predicted operational parameters, and the fault detection index is generated by combining the predicted operational parameters.

8. The method of claim 7 wherein combining the operational parameters of the output prediction vector comprises:

assigning a set of weights to the predicted operational parameters; and adding together the weighted operational parameters.

9. The method of claim 8 wherein the set of weights is assigned based upon the similarity.

10. The method of claim 1 further comprising:

including in the input vector a value of a passive-inclusive sensor, ignoring the value of the passive-inclusive sensor in selecting the nearest neighbor vectors; and including the value of the passive-inclusive sensor in generating the fault detection index.

11. The method of claim 1 further comprising:

including in the input vector a value of a cluster sensor;

including the value of the cluster sensor in selecting the nearest neighbor vectors; and ignoring the cluster sensor in generating the fault detection index.

12. The method of claim 11 wherein the cluster sensor represents a stage in a semiconductor fabrication process when the group of correlating operational parameters is sensed.

13. The method of claim 6 wherein the vectors of the reference data library include a synthetic sensor, the method further comprising:

including in the input vector a null value of the synthetic sensor; and obtaining a predicted value of the synthetic sensor from the output prediction vector, the synthetic sensor ignored in selecting the nearest neighbor vectors and ignored in generating the fault detection index.

14. The method of claim 13 wherein the synthetic sensor is difficult or impossible to measure in real time during operation of the semiconductor fabrication tool, and is assigned to vectors of the library after completion of the processing.

15. An apparatus for detecting a fault in a semiconductor processing tool, the apparatus comprising:

a first sensor, a second sensor, and a third sensor operatively coupled to the semiconductor processing tool;

a controller in communication with the semiconductor processing tool and with the first, second, and third sensors;

a memory coupled to the controller, the memory storing a computer program in computer readable format including computer instructions to control said controller to, receive from the first and second sensors correlating operational parameters of the semiconductor processing tool operating under a recipe, receive from the third sensor a non-correlating operational parameter from the tool;

compare the correlating operational parameters to corresponding operational parameters recorded during prior runs of the tool utilizing the recipe, and generate a fault detection index from comparing the sensed correlating operational parameters to the corresponding operational parameters recorded during prior runs.

16. The apparatus of claim 15 wherein the correlating operational parameters relate to tool pressure.

17. The apparatus of claim 15 wherein the correlating operational parameters relate to tool temperature.

18. The apparatus of claim 15 wherein the correlating operational parameters relate to tool power.

19. The apparatus of claim 15 wherein the correlating operational parameters relate to positioning of a wafer within the tool.

* * * * *